(12) United States Patent
Mori et al.

(10) Patent No.: US 6,288,461 B1
(45) Date of Patent: Sep. 11, 2001

(54) ELECTRIC ROTARY MACHINE

(75) Inventors: Hideaki Mori, Ibaraki; Tadashi Sonobe, Iwaki; Kado Miyakawa, Hitachi; Hiroshi Kimoto, Hitachinaka; Takashi Shibata, Hitachi; Shingo Yokoyama, Ibaraki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/429,953

(22) Filed: Oct. 29, 1999

(30) Foreign Application Priority Data

Oct. 30, 1998 (JP) ................................. 10-309835

(51) Int. Cl.⁷ ....................................... H02K 9/00
(52) U.S. Cl. ............................. 310/58; 310/60 A; 310/61
(58) Field of Search ................................. 310/58, 60 A, 310/61, 201, 261

(56) References Cited

U.S. PATENT DOCUMENTS

| | | | |
|---|---|---|---|
| 2,791,707 | * | 5/1957 | Willyoung ............................... 310/61 |
| 2,986,664 | * | 5/1961 | Willyoung et al. ...................... 310/61 |
| 3,322,985 | * | 5/1967 | Azbukin ................................. 310/61 |
| 3,395,299 | * | 7/1968 | Quay ....................................... 310/261 |
| 3,660,702 | * | 5/1972 | Kishino ................................... 310/61 |
| 3,995,180 | * | 11/1976 | Giles ....................................... 310/55 |
| 4,390,806 | * | 6/1983 | O'Brien et al. ........................ 310/261 |
| 4,634,910 | * | 1/1987 | Schollhorn ............................. 310/214 |
| 4,900,956 | * | 2/1990 | Gavilondo et al. .................... 310/61 |
| 5,483,112 | * | 1/1996 | Biseli et al. ............................ 310/61 |
| 5,777,406 | * | 7/1998 | Bomba et al. .......................... 310/61 |

* cited by examiner

Primary Examiner—Joseph Waks
(74) Attorney, Agent, or Firm—Antonelli, Terry, Stout & Kraus, LLP

(57) ABSTRACT

In order to provide an electric rotary machine in which the cooling performance can be improved without providing specific means on the flow path of cooling gas and without increasing the flow rate of the cooling gas, a plurality of through holes 21 perforated in each of plate-shaped conductors 16 forming a winding conductor 15 are arranged in plural rows of through holes 21a, 21b in the width direction of the plate-shaped conductor, a plurality of cooling gas flow paths 20 formed in the winding conductor 15 branch off into plural rows and the cooling area for the cooling gas is increased.

17 Claims, 9 Drawing Sheets

ELECTRIC ROTARY MACHINE

BACKGROUND OF THE INVENTION

The present invention relates to an electric rotary machine in which a rotor winding is provided with an air gap pick-up type cooling structure.

For example, as disclosed in page 151 of "MANUFACTURING AND MAINTENANCE OF ELECTRIC MACHINE COIL" by H. Sequenz, issued by DEVELOPMENT COMPANY on Jan. 1, 1990, in this cooling structure, a plurality of plate-shaped conductors forming a winding conductor each have a plurality of through holes perforated therein and a plurality of V-shaped flow paths each permitting cooling gas to flow in the axial direction of the rotor core while allowing the cooling gas to flow in the radial direction are formed in the winding conductor.

However, an electric rotary machine employing the above-mentioned cooling structure could not increase a quantity of cooling gas flowing in the cooling gas flow paths even if a thermal load was increased according to increase of output. Therefore, the cooling performance could not be improved and output could not be increased. This reason is that dynamic pressure occurring on the entry side of the cooling gas flow paths and negative pressure occurring on the exhaust side are determined fixedly by an outer diameter and rotation numbers of the rotor. That is, the outer diameter of the rotor, in the case of two poles, is limited to about 1 m because of restriction on material strength thereof, and the revolution number is determined 3000 rpm or 3600 rpm.

Further, in an electric generator employing the above-mentioned cooling structure, heat transfer of the cooling gas could not be increased and the cooling performance could not be improved even if flow of the cooling gas was disturbed by making the inner side of the cooling gas flow paths concave and convex. This reason is that the temperature of cooling gas increases according to increase in flow resistance of the cooling gas and an increment of the heat transfer of the cooling gas is canceled with the temperature increase. Although it was desirable to increase a quantity of cooling gas, it could not be increased for the above-mentioned reasons.

SUMMARY OF THE INVENTION

An object of the present invention is to provide an electric rotary machine which is able to increase the cooling performance without providing any specific means on cooling flow paths and without increasing a flow rate of cooling gas.

A basic feature of the present invention resides in that a plurality of plate-shaped conductors and a plurality of insulators sandwiched between the plurality of plate-shaped conductors each have a plurality of flow paths in which cooling gas introduced from the periphery of a rotor core flows in an axial direction of the rotor core while flowing in a radial direction of the rotor core, that is, a plurality of through holes for forming a plurality of V-shaped flow paths which extend in a radial direction of the rotor core while deviating in a axial direction of the rotor core, and the through holes are in a plurality of rows each placed in a width direction of the conductor and the V-shaped flow paths each branch in a plurality of rows each placed in the width direction of the conductor. According to the present invention, the cooling performance can be improved without providing the flow paths with any specific means and without increasing a flow rate of the cooling gas.

Further, in the present invention, a plurality of through holes or flow paths formed in at least a conductor of the second step from the bottom step and in a conductor of the top step, of the plurality of conductors are formed in one row in the width direction of the conductor. According to the present invention, flow path areas of the winding conductors at the bottom step and top step can be made large and a cooling gas flow resistance can be made small.

Further, in the present invention, the number of row, placed in the width direction of the conductor, of through holes or flow paths formed in a conductor or conductors on the lower step side, of the plurality of conductors is smaller than the number of row, placed in the width direction of the conductor, of through holes perforated or flow paths formed in a conductor or conductors on the upper step side. According to the present invention, even if the conductor is made so that the width becomes small and the thickness becomes large as it approaches to a bottom portion, a construction can be taken in which a plurality of through holes or flow paths can be arranged in a plurality of rows each placed in the width direction of the conductor.

Further, in the present invention a flow path area each of the plurality of through holes or flow paths formed in plurality of rows is set so that the following relation is established $$0.2 \leq WH/WC \leq 0.7$$

where the width size of the conductor is WC, and the total size of width, in the width direction of the conductor, of the through hole or flow path formed in plurality of rows is WH. According to the present invention, current density does not becomes large and a heat generation amount does not increase.

Further, in the present invention a width size, in the width direction of the conductor, of a portion between the rows of said through holes or flow paths formed in plurality of rows is set so that the following relation is established $$5 \leq LH/WL \leq 20$$

where the width size, in a length direction of the conductor, of the through hole or flow path formed in a plurality of rows the conductor is LH, and the width size, in the width direction of the conductor, of the portion between rows of the through hole or flow path formed in plurality of rows is WL. According to the present invention, such a problem can be avoided that current is concentrated on mounting root portions of ligament portions which are between the rows of the through holes or flow paths formed in a plurality of rows to increase heat generation concentration, and the heat resistance becomes large by rapid change in cross-section of the ligament portions, whereby the ligament portions does not work effectively as fins.

The width direction of conductor in the present invention means a direction opposite to two sides long in length of four sides forming a plane of the conductor. The longitudinal direction of the conductor means a direction opposite to two side short in length of the four sides forming a plane of the conductor.

DESCRIPTION OF PREFERRED EMBODIMENTS

Figure 1:
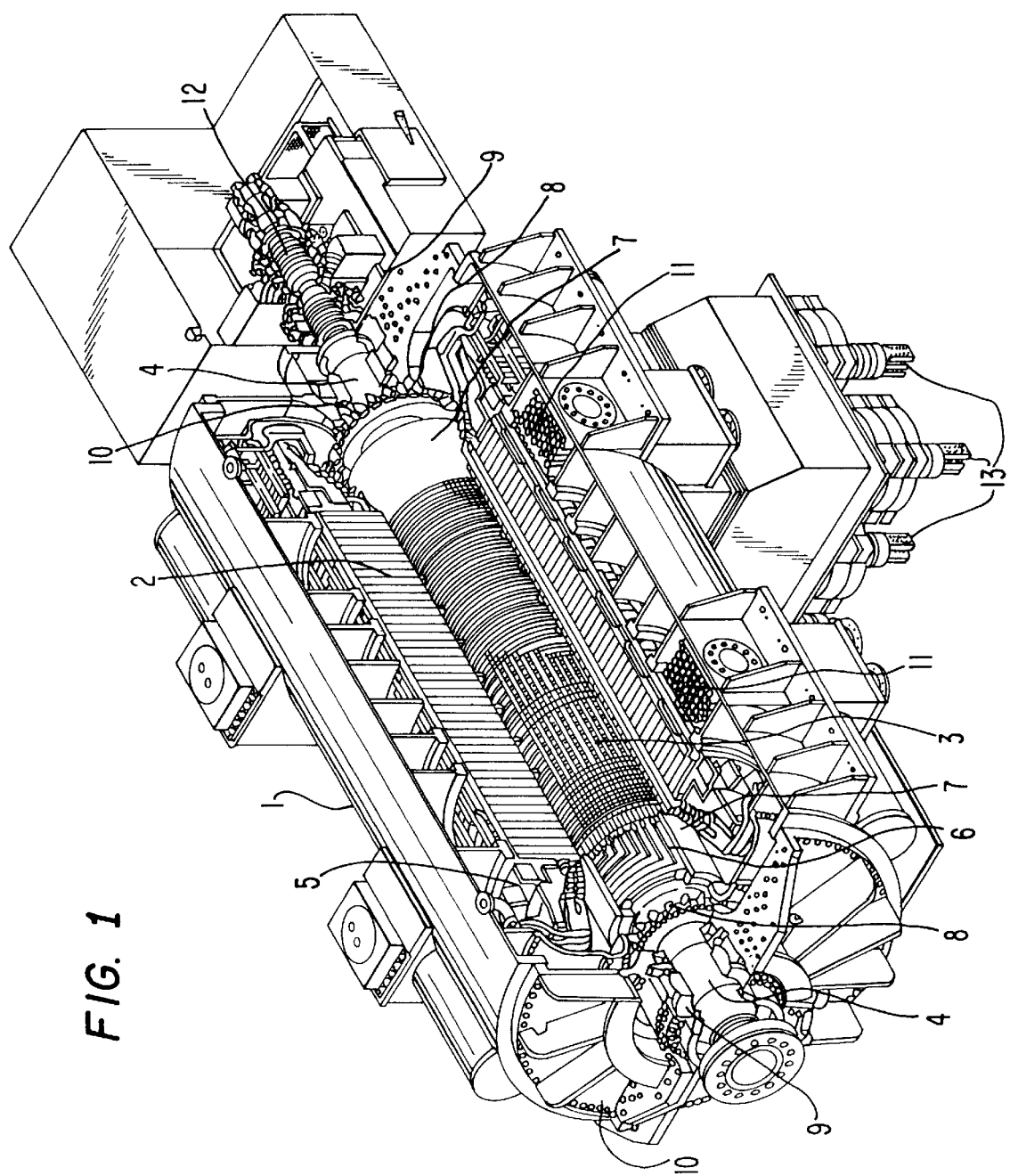
FIG. 1 is a perspective view of a structure of a turbine generator of a first embodiment of the present invention.

FIGS. 1 to 4 show a structure of a turbine generator of a first embodiment of the present invention.

In FIGS. 1 to 4, reference number 1 denotes a stator frame. A cylindrical stator core 2 is fitted in an inner periphery of the stator frame 1. The stator core 2 has a plurality of axially extending slots formed therein, and stator windings 5 are contained in the slots. Conductive bound wire cases called clips serving electric connection between the windings while supplying and exhausting cooling water to and from hollow winding conductors are fixed to the ends of the seator windings 5. The stator core 2 has a plurality of radially extending ventilating ducts formed therein.

A rotor core 3 is rotatably arranged on the inner periphery side of the stator core 2 through an air gap. The rotor core 3 has a plurality of axially extending slots formed in a peripheral. portion thereof, and rotor windings 6 are contained in the slots. Annular retaining rings 7 are provided on the both end portions of the rotor core 3 to press the end portions of the rotor windings 6. The rotor core 3 has a rotating shaft 4 integrally formed on the center axis and extending to both axial sides.

Brackets 10 which are annular closing members are provided on both end portions of the stator frame 1. Bearing devices 9 are provided on the inner periphery side of the brackets 10 to rotatably support the rotating shaft 4. Cooling fans 8 are provided on the rotating shaft 4 at a more inner side than the bearing device 9. A plurality of coolers 11 are provided in a space between the stator frame 1 and the stator core 2 to cool the cooling gas recirculating inside the machine by the cooling fans 8.

An electric collector 12 for supplying power to the rotor windings 6 during rotation is provided on one end of rotating shaft 4 (at a more outer side than the bearing device 9). The collector 12 has a brush made of carbon and held on a collector ring provided on one end of the rotating shaft 4 (at a more outer side than the bearing device) by a brush holder so that the brush is pressed on the collector ring to be in contact therewith, for electrically connecting a stator side and a rotor side. A connecting portion with the turbine which is a rotating source of the generator is formed at the other end of the rotating shaft 4 (at a more outer side than the bearing device 9). Terminals 13 for taking out generated power outside are provided outside the stator frame 1.

Figure 3:
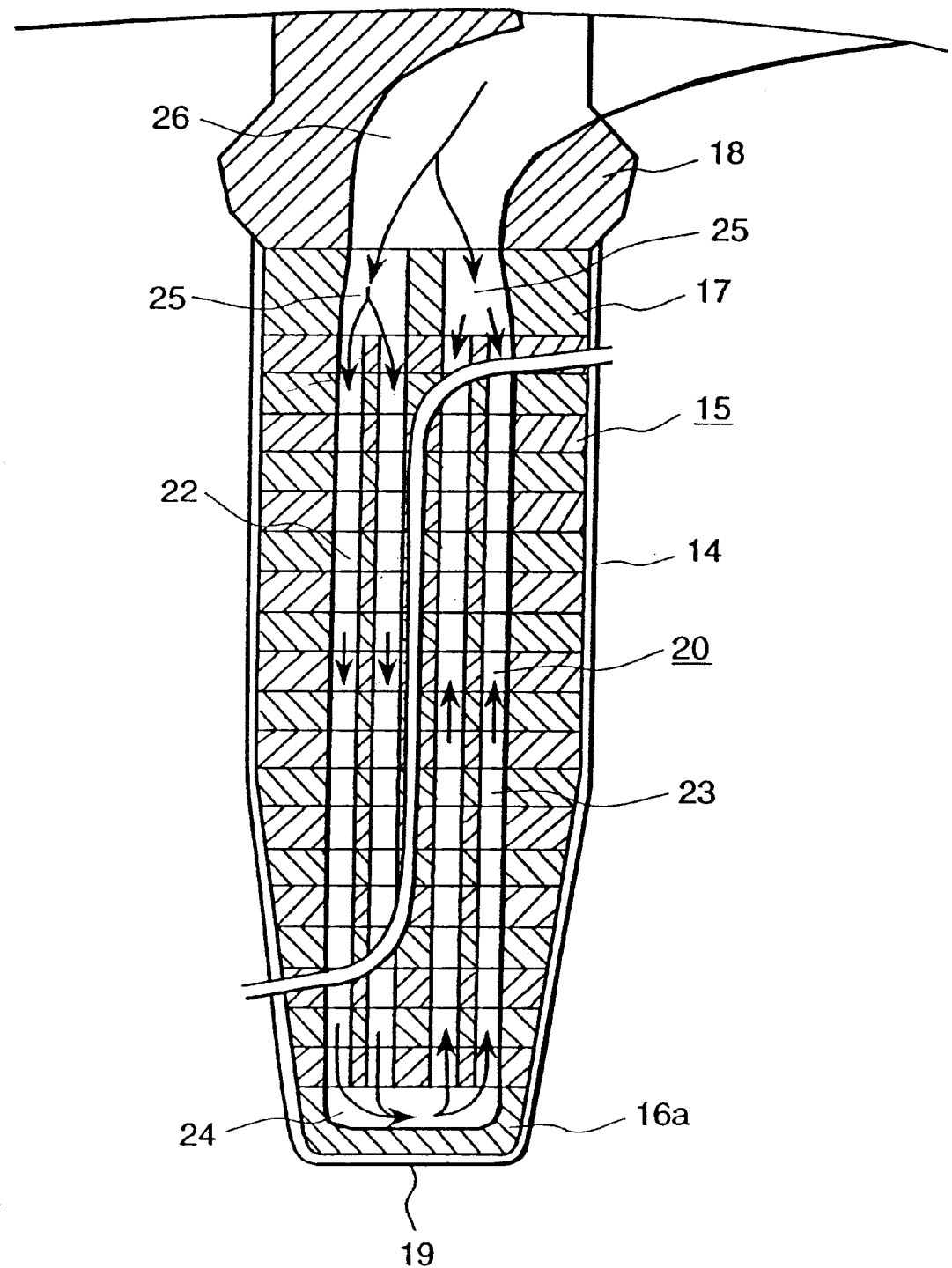
FIG. 3 is a sectional view taken along a line III—III of FIG. 2.
Figure 4:
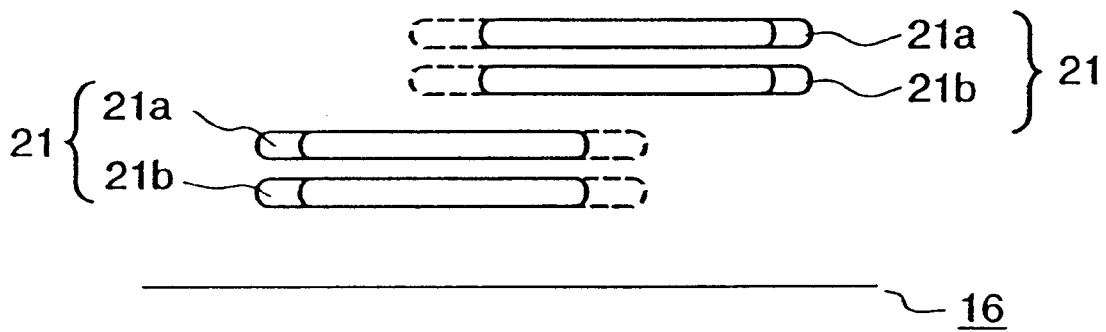
FIG. 4 is a plan view of a structure of through holes perforated in a plate-shaped conductor of FIG. 3.

Next, a structure of the rotor winding 6 will be explained in detail, referring to FIGS. 2 to 4.

The rotor winding comprises a winding conductor 15. The winding conductor 15 is formed of a plurality of plate-shaped conductors 16 laminated in plural steps through inter-phase insulators (not shown) and contained in the slots 14 through insulating plates 19. For the insulating plate 19, for example, a FPR (insulator of which the main component is glass fiber) is used which has an excellent electric resistance characteristic. A creepage block 17 is provided at a top portion of the winding conductor 15, and secures insulation to earth for the winding conductor 15. A wedge 18 is provided on an upper portion of the creepage block 17, to prevent the winding conductor 15 from flying out from the slots 14.

Figure 2:
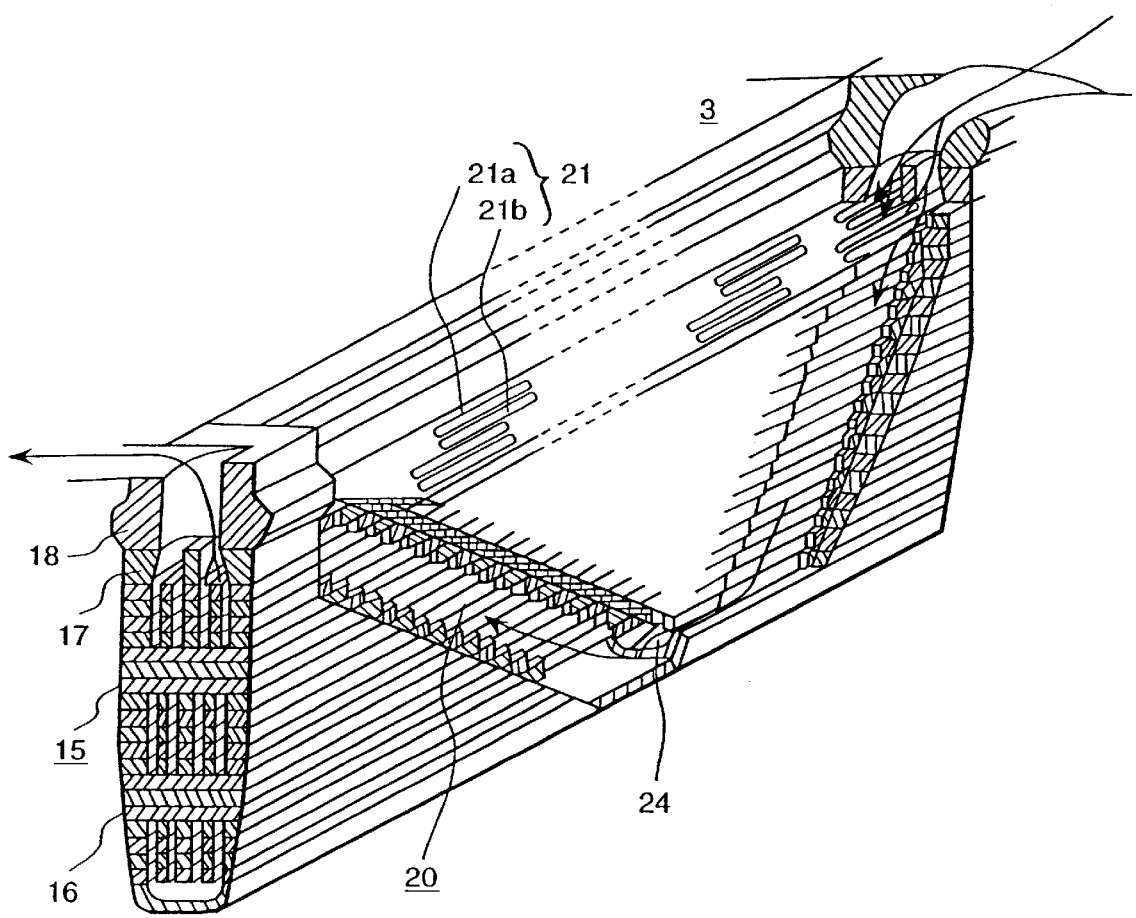
FIG. 2 is a sectional view of a cooling structure for a rotor winding of FIG. 1.

In the winding conductor 15, as shown in FIG. 2, a plurality of V-shaped cooling gas flow paths 20 are formed which allows the cooling gas to flow in the axial direction of the rotor core while allowing the cooling gas to flow in the radial direction of the rotor core 3. As shown in FIG. 3, the plate-shaped conductors 16 except for a plate-shaped conductor 16a at the bottom step and the inter-phase insulators each have a plurality of elliptic through holes 21 perforated therein and the through holes 21 each of which is composed of through holes 21a and 21b in two rows are arranged in the longitudinal direction of the plate-shaped conductors in two rows in the width direction of the plate-shaped conductors. The positions of through holes 21 are deviated in the longitudinal direction from each other for each plate-shaped conductor 16 except for the bottom step plate-shaped conductor 16a and for each inter-phase insulator. Here, the width direction of plate-shaped conductor means an opposite direction to 2 longer sides of 4 sides forming a plane of the plate-shaped conductor. The longitudinal direction of plate-shaped conductor means an opposite direction to 2 shorter sides of 4 sides forming a plane of the plate-shaped conductor.

Thereby, the plurality of through holes 21 perforated in each plate-shaped conductor 16 except for the plate-shaped conductor 16a at the bottom step and each inter-phase insulator continue in the radial direction of the rotor core 3 while deviating in the axial direction of the rotor core 3. Thereby, a plurality of entry side flow paths 22 and exhaust side flow paths 23 are formed in the winding conductor 15. Further, the entry side flow paths 22 and exhaust side flow paths 23 each branches in two rows in the width direction of plate-shaped conductor. Arrows in FIGS. 2 and 3 indicate flows of hydrogen gas which is a cooling gas. The plate-shaped conductor 16a at the bottom step has a plurality of U-shaped grooves 24 formed therein communicating the entry side flow paths 22 and the exhaust side flow paths 23. Thereby, a plurality of V-shaped flow paths 20 in which the cooling gas flows in the axial direction of the rotor core 3 while flowing in the radial direction of the rotor core 3 are formed inside the winding conductor 15.

A plurality of elliptic through holes 25 are perforated in the creepage block 17 in the longitudinal direction of the plate-shaped conductors in two rows in the width direction of the plate-shaped conductors. A plurality of through holes 26 are perforated in the wedge 18 in the longitudinal direction of the plate-shaped conductors. The through holes 26 are different in shape between the entry side and the exhaust side. At the cooling gas entry side, the through holes are bent in the rotation direction of the rotor core 3 and. opened to an outer peripheral surface of the rotor core 3. At the cooling gas exhaust side, the through holes are bent in an opposite direction to the rotation direction of the rotor core 3 and opened to the outer peripheral surface of the rotor core 3. Thereby, the outer peripheral portion of the rotor core 3 communicates with the cooling gas flow path 20. Therefore, the cooling gas enters the cooling gas flow path 20 at the air gap and is exhausted from the cooling gas flow path 20 into the air gap.

Next, a working (reduction) method of the through holes 21 will be explained.

In the present embodiment, the through holes 21 are formed in the plate-shaped conductors 16 by punching by a punching apparatus or machining by a cutting machine. In the case of punching by the punching apparatus, a dice prepared to meet with the shape of the through hole 21a, 21b is attached to the punching apparatus, and the plate-shaped conductor is punched from one surface side thereof to perforate the through holes 21. In the case of machining by the cutting machine, two cutting blades prepared to meet with the width size of the through holes 21a, 21b in the width direction of the plate-shaped conductor are attached to a cutter shaft of the cutting machine so as to meet with the width size between the through holes 21a, 21b in the width direction of the plate-shaped conductor to cut the plate-shaped conductor from both sides and form the through holes 21. According to those working methods, through holes 21 in two rows can be formed at a time without increasing manufacturing processes.

According to the first embodiment explained above, a plurality of through holes 21 composed of elliptic through holes 21a, 21b in two rows in the width direction of the plate-shaped conductor are formed in the longitudinal direction, so that the cooling gas flow paths 20 each can branch off in tow rows in the width direction of plate-shaped conductor, whereby a cooling area of the cooling gas increases and the cooling performance can be improved.

Figure 6:
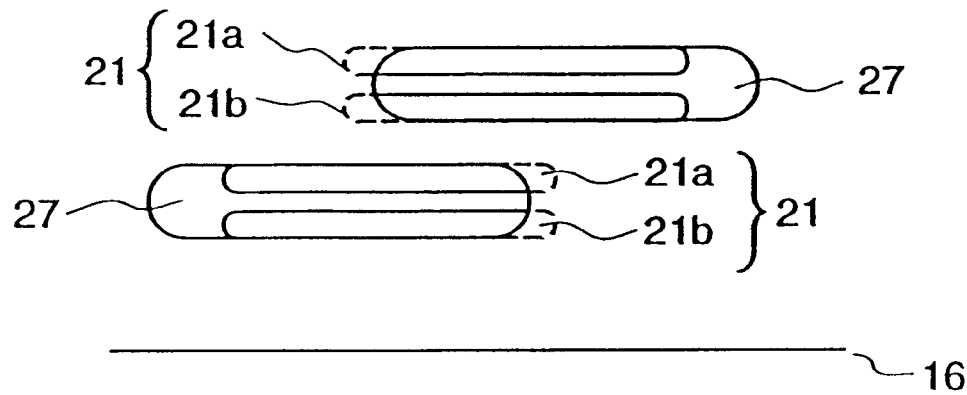
FIG. 6 is a plan view of a structure of through holes perforated in a plate-shaped conductor of FIG. 5.
Figure 5:
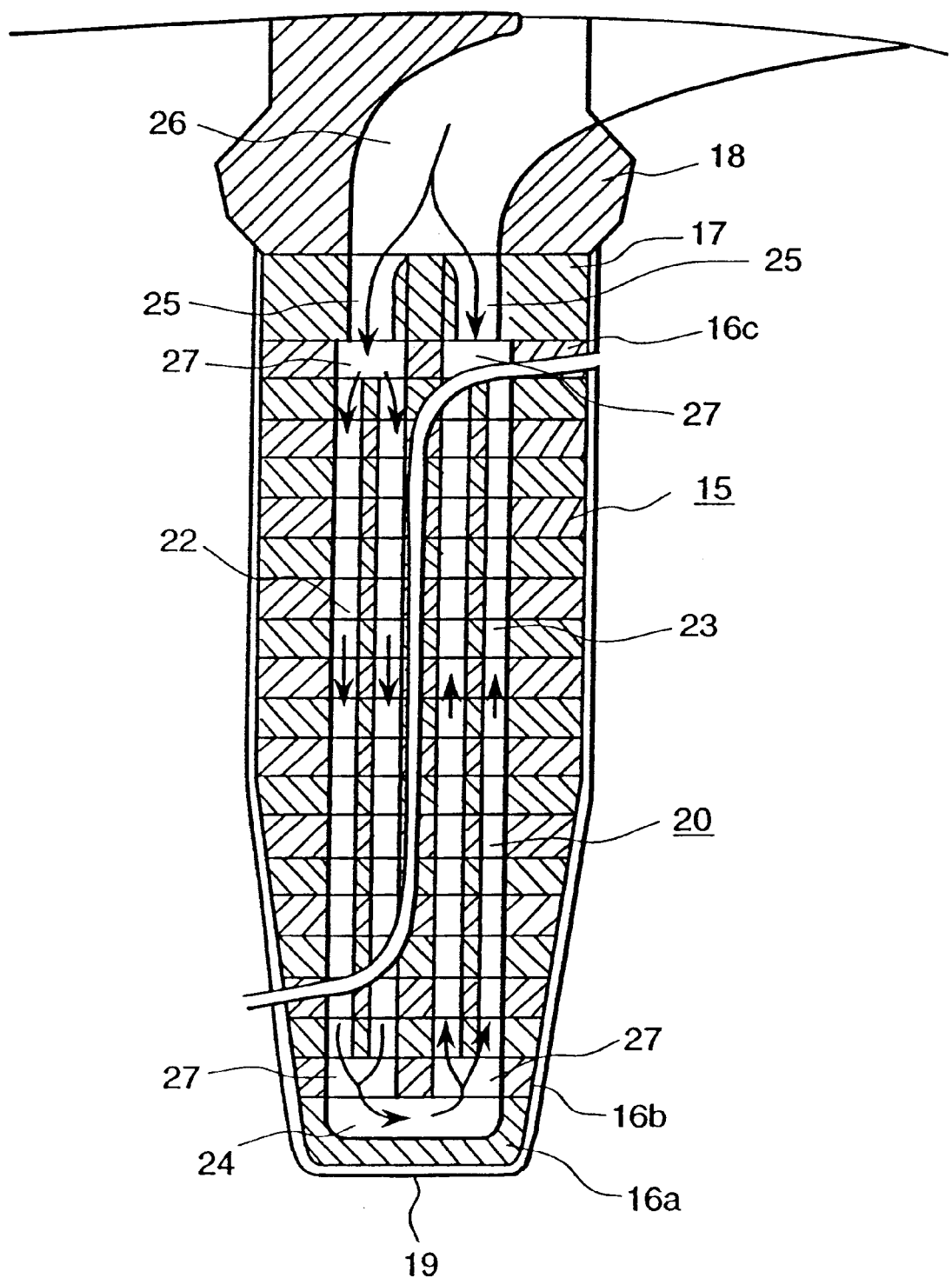
FIG. 5 is a sectional view of a cooling structure for rotor windings of a turbine generator of a second embodiment of the present invention.

A structure of turbine generator of a second embodiment of the present invention is shown in FIGS. 5 and 6.

The present embodiment is an example of improvement of the first embodiment, in which through holes 27 perforated in the plate-shaped conductor 16b at the second step to the bottom step and the top step plate-shaped conductor 16c, of the plate-shaped conductors 16 each have a plurality of through holes 27 formed therein in one row in the width direction of plate-shaped conductor. An opening size, in the width direction of plate-shaped conductor on the side of the winding conductor 15, of the through hole 25 is made smaller than an opening size, in the width direction of plate-shaped conductor, of the through hole 27.

The reason why a construction is taken is that the flow areas at the bottom step and the top step are necessary to be made large. That is, the flow resistance to the cooling gas is likely to become large at the bottom step of the winding conductor 15 by the groove 24 and the flow resistance to the cooling gas is likely to become large in the top step side of the winding conductor 15 by the through holes 25. When the flow resistance to cooling gas becomes large, a flow rate of the cooling gas decreases, the temperature of the cooling gas increases and an effect due to increase in cooling area is reduced. For the above reasons, the above-mentioned structure is taken.

Further, as a method of making a flow area of cooling gas larger, it was also considered to increase the flow areas of the groove 24 and the through holes 25, however, this method reduces the mechanical strength of materail, so that it is not preferable in design. Particularly, since the creepage block 17 is made of material of organic compounds which is small in surface pressure irrespective of receiving a large surface pressure caused by whole centrifugal force of the winding conductor 15, it is not preferable to increase the flow area of the through holes 25. Therefore, the above-mentioned structure is preferable. Further, the other construction is the same as in the previous embodiment, so that explanation thereof is omitted.

According to the second embodiment explained above, since the plurality of through holes 27 perforated in the plate-shaped conductor 16b at the second step to the bottom step and the top step plate-shaped conductor 16c of the plate-shaped conductors 16 are in one row in the width direction of the plate-shaped conductor, it is possible to make large the flow areas in the bottom step and the top step of the winding conductor 15 and to make small the flow resistance to the cooling gas at the bottom step and top step of the winding conductor 15. Therefore, the cooling performance can be more improved than the previous embodiment.

Figure 7:
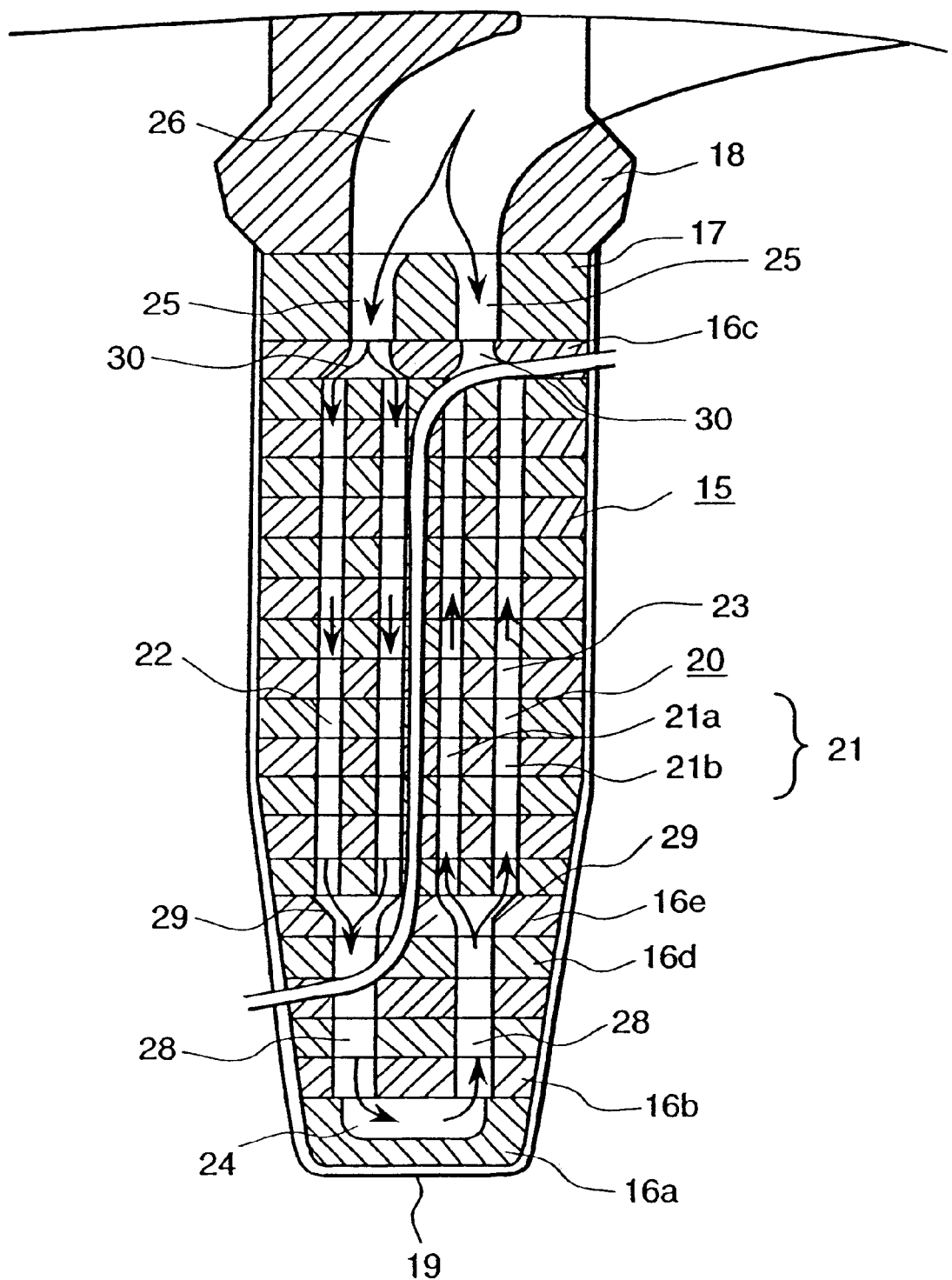
FIG. 7 is a sectional view of a cooling structure for rotor windings of a turbine generator of a third embodiment of the present invention.

A third embodiment of the present invention is shown in FIG. 7.

In the present embodiment, an application to a structure is considered in which the width of plate-shaped conductor becomes smaller and its thickness becomes larger as it approaches to the bottom of the slot 14. That is, in some cases, the width of the slot 14 is made smaller as it approaches to the bottom so that the stress applied on slot teeth portions which are core portions between the slots 14 does not become large. In such a case, since the plate-shaped conductor is shaped as mentioned above, a plurality of through holes perforated in the plate-shaped conductors on the lower step side of the winding conductor 15 can not be made in two rows. Therefore, in the present embodiment, a plurality of through holes 28 perforated in the plate-shaped conductors 16b to 16d at the steps of from the second step to the bottom step to the fifth step are arranged in one row in the width direction of the plate-shaped conductors.

Further, the flow resistance to cooling gas is apt to increase at the portion at which the row number of through holes changes, so that it is necessary to increase the flow area there. Therefore, in the present embodiment, a plurality of through holes 29 perforated in a plate-shaped conductor 16e at the sixth step to the bottom step are arranged in one row in the width direction of the plate-shaped conductor, an opening size in the width direction of plate-shaped conductor on the bottom side of the slot 14 is made equal to an opening size of the through hole 28 in the width direction of plate-shaped conductor, and an opening size in the width direction of plate-shaped conductor on the side of creepage block 17 is made equal to the width size of the through hole 21 in the width direction of plate-shaped conductor.

Further, for the same reason as the above, a plurality of through holes 30 perforated in the plate-shaped conductor 16b at the top step are arranged in one row in the width direction of plate-shaped conductor, an opening size in the width direction of plat-shaped conductor on the bottom side of the slot 14 is made equal to the width size of the through hole 21 in the width direction of plate-shaped conductor, and the opening size in the width direction of plate-shaped conductor on the side of creepage block 17 is made smaller than the opening size of the through hole 25 in the width direction of plate-shaped conductor on the side of winding conductor 15.

Further, in order to make large the flow area of the winding conductor 15 on the bottom step side, the width size of the groove 24 in the width direction of plate-shaped conductor is made smaller than a width size, in the width direction of plate-shaped conductor, from a slot(14)-side side-wall of the entry side flow path formed by the through hole 28 to a slot(14)-side side wall of the exhaust side flow path formed by the through hole 28. Further, the other construction is the same as the previous embodiment, so that its explanation is omitted.

According to the third embodiment explained above, the plurality of through holes 28 perforated in the plate-shaped conductors 16b to 16d at the steps form the second step to the fifth step, counted from the bottom step are arranged in one row in the width direction of the plate-shaped conductor, and the row number of through holes in the width direction of plate-shaped conductor is made smaller than the number of rows in the width direction of the through holes 21 perforated in the plate-shaped conductor 16 on the upper step side of the winding conductor 15, so that the through holes 21 perforated in the plate-shaped conductor 16 on the upper step side of the winding conductor 15 can be arranged in two rows in the width direction of plate-shaped conductor even if the width of the plate-shaped conductor 16 decreases and its thickness increases as it approaches to the bottom of the slot 14. Thereby, a cooling area of cooling gas can be increased and the cooling performance can be improved.

Further, according to the third embodiment, a flow area of portions in which the row number of through holes changes, that is, the plate-shaped conductor 16e at the sixth step to the bottom step and the plate-shaped conductor 16c at the top step are made large, so that a flow resistance to cooling gas at the portions in which the row number of through holes changes can be made small. Therefore, the cooling performance can be improved by a degree corresponding to the reduction of flow resistance.

In the first to third embodiments as explained above, although the through holes perforated in the plate-shaped conductors forming the winding conductor are in two rows in the width direction of plate-shaped conductor, the number of rows in the width direction of plate-shaped conductor of through holes can be 3 or 4. Further, when the through holes are perforated in a plurality of rows, a flow path area of the through holes arranged in rows and a width size of inter-row portions of the through holes in rows each are set so that the following equations are established.

That is, the flow path area each of the plurality of through holes formed in plurality of rows is set so that the following relation is established $$0.2 \leq WH/WC \leq 0.7$$

where width size of the conductor is WC, and total size of the width, in the width direction of the conductor, of the through hole or flow path formed in plurality of rows is WH.

Further, a width size, in the width direction of the conductor, of a portion between the rows of the through holes formed in plurality of rows is set so that the following relation is established $$5 \leq LH/WL \leq 20$$

where a width size, in a length direction of the conductor, of the through holes formed in a plurality of rows is LH, and width size, in the width direction of the conductor, of the portion between rows of the through holes in plurality of rows is WL.

The reason why the flow path area of each of the through holes formed in a plurality of rows and the width size of a portion between the rows of through holes formed in a plurality of rows are set in this manner is that it was found by experiment that the cooling performance could not be improved even if the through holes perforated in the plate-shaped conductor were arranged in a plurality of rows to increase the cooling area of cooling gas. Hereunder, it is explained, referring to the drawings.

Figure 8:
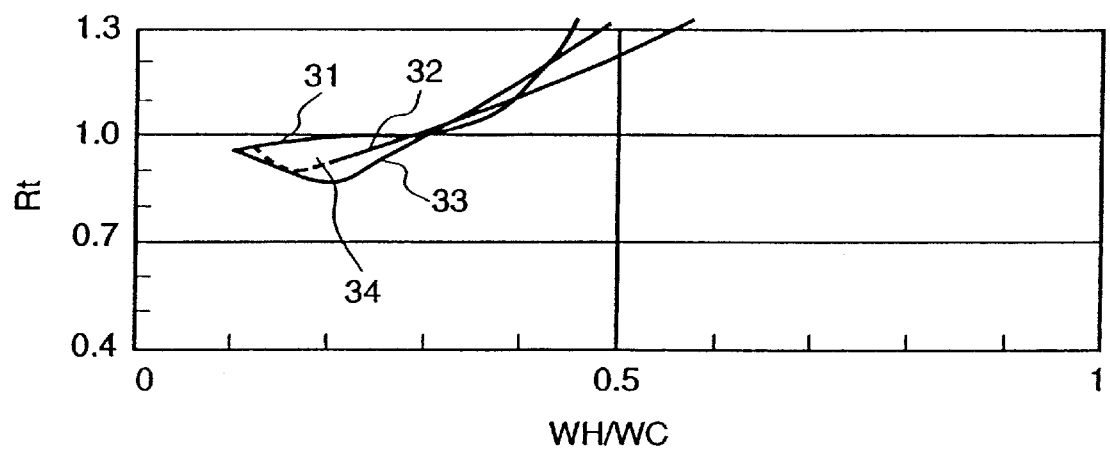
FIG. 8 is a graph showing relations of temperature rising rates of a winding conductor to ratios between the width size of plate-shaped conductor and total width size, in the width direction of the plate-shaped conductor, of through holes.

FIG. 8 shows relations of temperature rising rates Rt of a winding conductor to ratios between the width size WC of plate-shaped conductor and total width size WH, in the width direction of the plate-shaped conductors, of a plurality of through holes, in the case where the through holes are perforated in one row in the plate-shaped conductor. A solid line 31 denotes the above mentioned relation in the plate-shaped conductor at the second step to the bottom step, a solid line 32 denote the above-mentioned relation in the plate-shaped conductor at a portion corresponding to an average radius and a solid line 33 denotes the above mentioned relation in the plate-shaped conductor at the top step.

The solid lines 31 to 33 cross with each other at a point at which a ratio between WH and WC is 0.3 and Rt is 1.0. Really, since the width size of through hole in the width direction is set constant due to manufacturing, the crossing point of the solid lines 31 to 33 are distributed in a range of 0.25 to 0.4 in ratio and Rt is about 1.0 in all the range. Here, when the through holes are arranged in ½ row, the relation of Rt to a ratio between WH and WC is as indicated by a broken line 34. As is apparent from FIG. 8, Rt decreases as compared with the case where the through holes are in one row. In this manner, the reason that Rt decreased is that the current density decreased as compared with the case where the through holes are in one row.

Figure 9:
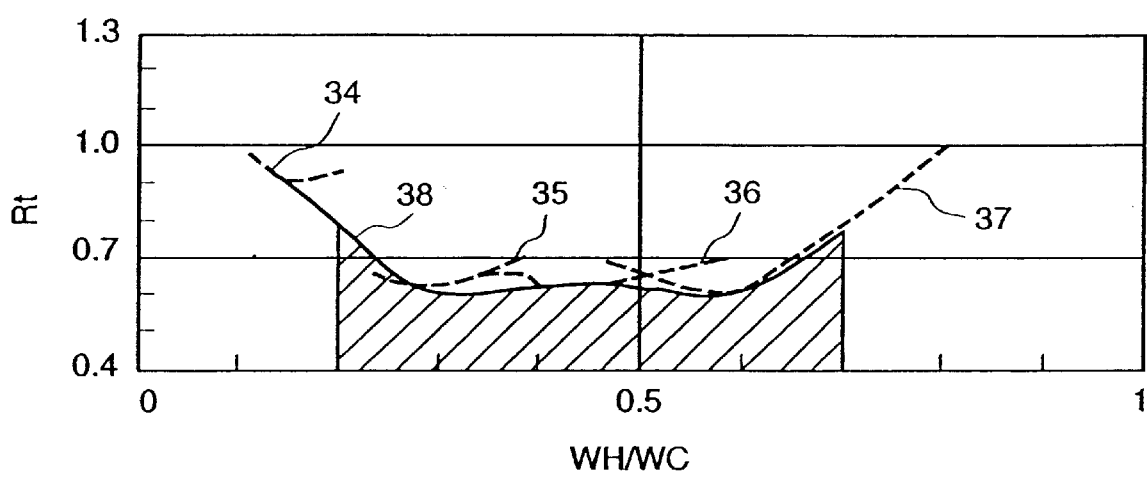
FIG. 9 is a a graph showing relations of temperature rising rates of winding conductors to ratios between the width size of a plate-shaped conductor and total width size, in the width direction of the plate-shaped conductor, of through holes.

FIG. 9 shows relations of Rt to ratios between WC and WH as in FIG. 7, in the case where a plurality of through holes are ½ row, 2 rows, 3 rows and 4 rows. Broken lines 34, 35, 36 and 37 denote the above-mentioned relations in the through holes formed in a ½ row, in the through holes in 2 rows, in the through holes in 3 rows and in the through holes in 4 rows, respectively. A solid line 38 is a line formed by connecting minimum values in the broken lines 34 to 37.

Further, the reason that the ratio between WH and WC changes even if the row number of through holes is the same is that WC changes according to the positions inside the slot. Further, the reason that the ratio between WH and WC increases as the row number of the through holes increases is that there is a limit in the width size of through hole in the width direction due to manufacturing. Further, the reason that a minimum value appears in the ratios between WH and WC even if the row number of through holes is the same is that the temperature of the winding conductor rises according to the size of flow path area of through hole. That is, when the flow path area of through hole becomes too small, the flow resistance to cooling gas increases and the temperature of cooling gas increases, while the current density increases and a heat generation amount of the winding conductor increases when the flow path area of through holes becomes too large.

As is apparent from FIG. 9, minimum value distribution of Rt in the through holes formed in 2 to 4 rows is concentrated on a portion of 0.6. This reason is that the current density becomes smallest each row number formed above and there is the through hole flow path area that an effect due to increase in cooling area for cooling gas is most remarkable. Therefore, in the case where the through holes are in a plurality of rows, the flow path area is set so that an effect due to increase in cooling area for cooling gas is not canceled by an effect due to the largeness of current density. As a result, it was confirmed that an effect due to increase in cooling area for cooling gas is not canceled by an effect due to the largeness of current density by forming the through holes in 2 to 4 rows and setting a flow path area of through hole in a range of 0.2 to 0.7 in a ratio between WH and WC.

Further, even if the conditions of the through hole row number and the flow path area of through holes are satisfied, it is not preferable in design unless the mechanical strength of plate-shaped conductors is secured. For example, when the flow path area of through holes becomes too large, the surface pressure to a plate-shaped conductor by centrifugal force becomes too large, so that compression deformation is apt to occur in the plate-shaped conductor. Further, since compression stress or tensile stress in the longitudinal direction becomes large as the temperature increases, creep deformation is apt to occur in the plate-shaped conductor in the longitudinal direction. Thereby, deformation of the winding conductor at an end of the rotor winding becomes remarkable, and there is the fear that short circuit occurs between the winding conductors. Considering this fact, it is preferable that the ratio between WH and WC is 0.5 or less.

Further, when the width size, in the width direction of plate shaped conductor, of ligament portions of through holes formed in a plurality of rows is too small, it becomes easy to deform by high centrifugal force, and an effect due to increase in cooling area for cooling gas also becomes small. Further, the ligament portion serves as a kind of fin and has a function of removing generated heat. However, when the width size of the ligament portion in the width direction of plate-shaped conductor becomes small, current concentrates on a root portion of the ligament portion and heat generation density becomes large and heat resistance by rapid change in cross-section becomes large, so that it comes not to effectively work as fin. Therefore, it is necessary to optimize the width size of the ligament portion in the width direction at the same time the flow path area of through hole is made optimum.

Figure 10:
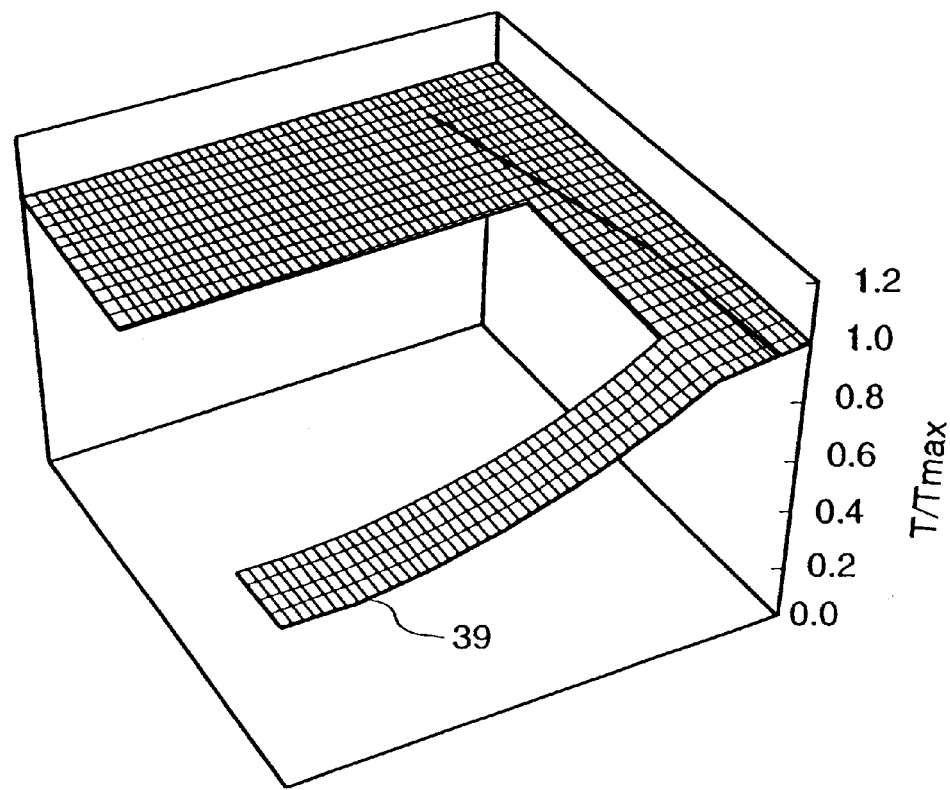
FIG. 10 is an illustration of temperature distributions in which temperature distributions of surroundings of the through holes are normalized by the maximum temperature in the case a plurality of through holes perforated in a plate-shaped conductor are in two rows.
Figure 11:
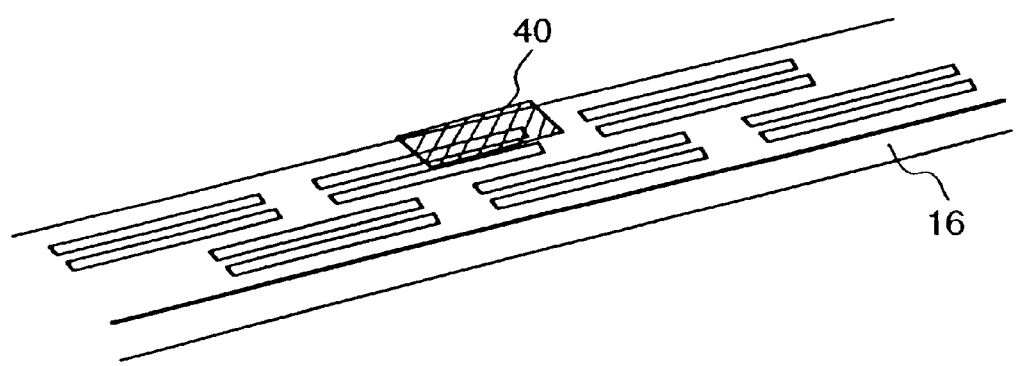
FIG. 11 is an illustration of a temperature distribution analysis region of surroundings of the through hole in FIG. 10.

FIG. 10 is an illustration showing temperature distribution in a temperature distribution analysis region 40 hatched of FIG. 11, normalized by the maximum temperature, in the case where through holes are formed in two rows. As is apparent from FIG. 10, the temperature of the ligament portion is lower than the other portion. This is because the width size of the ligament portion in the width direction of plate-shaped conductor is small and the thermal resistance of the ligament portion becomes large. Therefore, it is necessary to make large the width size of the ligament portion in the width direction to the temperature distribution of plate-shaped conductor constant.

Figure 12:
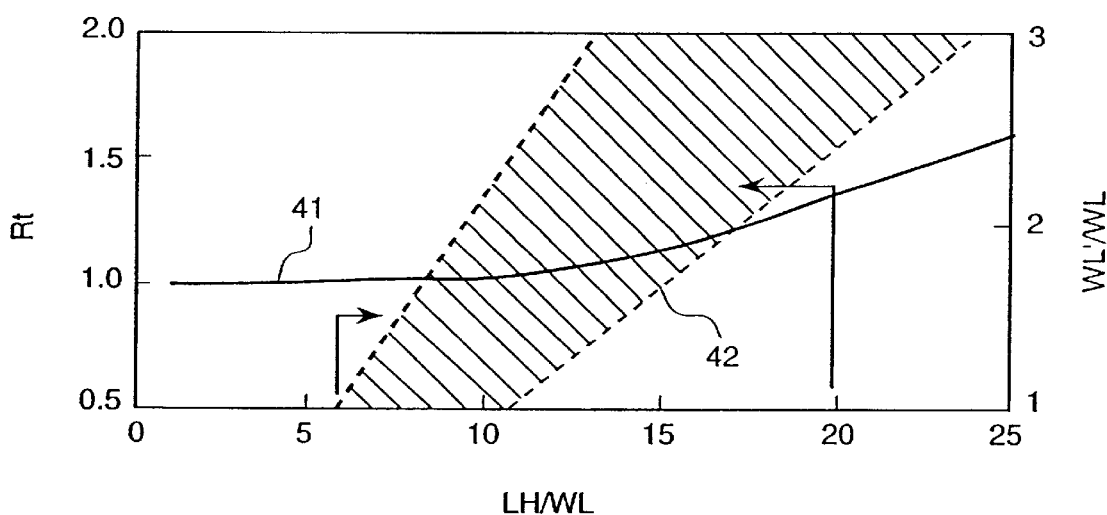
FIG. 12 is a graph showing relations of temperature rising degrees of the winding conductor to ratios between the width size of the through holes in longitudinal direction of plate-shaped conductors and the width size of ligament portion, in the width direction of the plate-shaped conductor, and relations of ratios between the width size of plate-shaped conductor portion outside the through holes in the width direction of plate-shaped conductors and the width size of ligament portion in the width direction of the plate-shaped conductor to ratios between the width size of the through holes in the longitudinal direction of the plate-shaped conductor and the width size of the ligament portion in the width direction of the plate-shaped conductor, in the case a plurality of through holes perforated in a plate-shaped conductor are in two rows.

FIG. 12 shows a relation of temperature rising degrees Rt of a winding conductor to ratios between the width size LH of through hole in the longitudinal direction and the width size WL of the ligament portion in the width direction of pate-shaped conductor, and a relation of ratios between the width size WL', in the width direction of plate-shaped conductor, of plate-shaped conductor portions outside through holes and WL to ratios between LH and WL. A solid line 41 indicates a relation of Rt to ratios between LH and WL. A hatched region 42 is a range in which the ratios between WL' and WL can be taken.

In this case, a temperature when the heat conductivity is assumed infinite is defined 1, so that when Rt is 1.0 more, the temperature distribution of plate-shaped conductors becomes constant. Therefore, when the through holes are in a plurality of rows, the width size of the ligament portion in the pate-shaped conductor is set so that an effect due to increase in a cooling area for cooling gas appears and the temperature distribution of the plate-shaped conductors becomes constant. As a result, when WL is set so that a ratio of LH and WL becomes 2.0 or less, it was confirmed that an effect due to increase in the cooling area for cooling gas appeared and the temperature distribution of the plate-shaped conductors became constant.

Further, in this case, a ratio between LH and WL becomes small by making WL large, however, since the width size of the plate shaped conductor is limited, WL' becomes small. Therefore, it is necessary to make the ratio between WL' and WL 1 or more so that WL' does not become small. As a result, it was confirmed that the ratio of WL' and WL could be 1 or more by setting the ratio of LH and WL to be 6 or more. Further, the reason why the ratio of LH and WL in which the ratio of WL' and WL can be 1 or more can have such a range as shown by the hatched region 42 is that the width size of plate shaped conductor differs according to the positions of slots. Furthers in the case where the through holes are in three rows, or in four rows, also, similar study was conducted. As a result, it was confirmed that the ratio between WL' and WL could be 1 or more by making the ratio between LH and WL 5 or more.

Accordingly, it was confirmed that such a phenomenon that current concentrates on the root portion of the ligament portion to increase heat generation concentration, heat resistance increases due to rapid change in cross-section, and the ligament portion does not work effectively as fin did not occur by setting the width size of the ligament portion in the width direction to be 5–20 in ratio between LH and WL.

What is claimed is:

1. An electric rotary machine comprising a rotor winding having a plurality of winding conductors accommodated in a plurality of slots formed in a rotor core and formed of a plurality of plate-shaped conductors laminated and insulated from one another, each said winding conductor having a plurality of through holes perforated therein to provide a plurality of flow paths for allowing a cooling gas introduced from a periphery of said rotor core to flow in an axial direction of said rotor core while simultaneously allowing the cooling gas to flow also in a radial direction of said rotor core, wherein said plurality of through holes are disposed in a plurality of rows arranged in a width direction of said conductors, said plurality of flow paths being of a plurality of entry side flow paths composed of at least two rows of said plurality of rows and a plurality of exhaust side flow paths composed of at least two other rows of said plurality of rows.

2. An electric rotary machine according to claim 1, wherein said plurality of through holes perforated or flow paths formed in at least a conductor at a second step to a bottom step of said conductors and in a conductor at the top step of said conductors, are formed in one row on each of cooling gas entry and exhaust sides in the width direction of said conductors.

3. An electric rotary machine according to claim 1, wherein the number of rows, arranged in the width direction of a conductor, of through holes perforated or flow paths formed in a conductor, or conductors on a lower step side of said plurality of conductors, is smaller than the number of rows, arranged in the width direction of said conductor, of through holes perforated or flow paths formed in a conductor or conductors on an upper step side.

4. An electric rotary machine according to claim 1, wherein a flow path area of each of said plurality of through holes or flow paths formed in a plurality of rows is set so that the following relation is established $$0.2 \leq WH/WC \leq 0.7$$

where the width of a conductor is WC, and total size of the width, in the width direction of a conductor, of said through hole or flow path formed in a plurality of rows is WH.

5. An electric rotary machine according to claim 1, wherein a width size, in the width direction of said conductor, of a portion between the rows of a through holes or flow paths formed in a plurality of rows is set so that the following relation is established $$5 \leq LH/WL \leq 20$$

where the size, in a length direction of said conductor, of said through hole or flow path formed in a plurality of rows is LH, and width size, in the direction of a conductor, of the portion between rows of said through hole or flow path formed in plurality of rows is WL.

6. An electric rotary machine according to claim 1, wherein a majority of said conductors have two rows of said plurality of rows forming said entry side flow paths and another two rows of said plurality of rows forming said exhaust side flow paths, each of said plurality of rows being one of said plurality of through holes.

7. An electric rotary machine according to claim 6, wherein at least one of an uppermost conductor and a lowermost conductor of said conductors having less than said two rows forming said entry side flow paths and said two rows forming said exhaust side flow paths.

8. An electric rotary machine comprising a rotor winding having a plurality of winding conductors accommodated in a plurality of slots formed in a rotor core and formed of a plurality of plate-shaped conductors laminated and insulated from one another, said winding conductors having a plurality of flow paths for allowing a cooling gas from a periphery of said rotor core to flow in an axial direction of said rotor core while simultaneously allowing the cooling gas to flow also in a radial direction of said rotor core, wherein said plurality of flow paths each branch off into a plurality of rows arranged in a width direction of said conductors, said plurality of flow paths being of a plurality of entry side flow paths composed of at least two rows of said plurality of rows and a plurality of exhaust side flow paths composed of at least two other rows of said plurality of rows.

9. An electric rotary machine comprising a rotor winding having a plurality of winding conductors accommodated in a plurality of slots formed in a rotor core and formed of a plurality of plate-shaped conductors laminated and insulated from one another, each said winding conductor having a plurality of through holes perforated therein to provide a plurality of V-shaped flow paths, wherein said plurality of through holes are disposed in a plurality of rows arranged in a width direction of said conductors, said plurality of flow paths being of a plurality of entry side flow paths composed of at least two rows of said plurality of rows and a plurality of exhaust side flow paths composed of at least two other rows of said plurality of rows.

10. An electric rotary machine comprising a rotor winding having a plurality of winding conductors accommodated in a plurality of slots formed in a rotor core and formed of a plurality of plate-shaped conductors laminated and insulated from one another, said winding conductors each having a plurality of V-shaped flow paths, wherein said plurality of V-shaped flow paths are disposed in a plurality of rows each arranged in a width direction of said conductors, said plurality of flow paths being of a plurality of entry side flow paths composed of at least two rows of said plurality of rows and a plurality of exhaust side flow paths composed of at least two other rows of said plurality of rows.

11. An electric rotary machine comprising a rotor winding having a plurality winding conductors accommodated in a plurality of slots formed in a rotor core and formed of a plurality of plate-shaped conductors laminated and insulated from one another, each said winding conductor having a plurality of through holes perforated therein to provide a plurality of flow paths continuing in the radial direction of said rotor core while deviating in the axial direction of said rotor core, wherein said plurality of through holes are disposed in a plurality of rows arranged in a width direction of said conductors, said plurality of flow paths being of a plurality of entry side flow paths composed of at least two rows of said plurality of rows and a plurality of exhaust side flow paths composed of at least two other rows of said plurality of rows.

12. An electric rotary machine according to claim 11, wherein said plurality of through holes perforated or flow paths formed in at least one winding conductor at a second step to a bottom step of said winding conductors and in a winding conductor at a top step of said winding conductors are formed in one row in the width direction of said winding conductors at the second and top steps.

13. An electric rotary machine according to claim 11, wherein a flow path area of each of said plurality of through holes or flow paths formed in a plurality of rows is set so that the following relation is established $$0.2 \leq WH/WC \leq 0.7$$

where the width of a conductor is WC, and the total size of the width, in the with direction of a conductor, of said through hole or flow path formed in a plurality of rows is WH.

14. An electric rotary machine according to claim 11, wherein a size, in the width direction of a conductor, of a portion between the rows of said through holes or flow paths formed in a plurality of rows is set so that the following relation is established $$5 \leq LH/WL \leq 20$$

where the size, in a length direction of said conductor, of said through hole or flow path formed in a plurality of rows is LH, and the size, in the with direction of a conductor, of the portion between rows of said through hole or flow path formed in a plurality of rows is WL.

15. An electric rotary machine comprising a rotor winding having a plurality of winding conductors accommodated in a plurality of slots formed in a rotor core and formed of a plurality of plate-shaped conductors laminated and insulated from one another, each said winding conductor having a plurality of flow paths formed therein continuing in the radial direction of said rotor core while deviating in the axial direction of said rotor core, wherein said plurality of flow paths each are V-shaped and branch off into a plurality of rows arranged in the width direction of said conductors, said plurality of flow paths being of a plurality of entry side flow paths composed of at least two rows of said plurality of rows and a plurality of exhaust side flow paths composed of at least two other rows of said plurality of rows.

16. An electric rotary machine comprising a rotor winding having a plurality of winding conductors accommodated in a plurality of slots formed in a rotor core and formed of a plurality of plate-shaped conductors laminated and insulated from one another, said plurality of conductors are made by at least one conductor arranged at a top of said slot, at least one conductor arranged on a bottom side of said slot and a plurality of conductors arranged intermediately between said top and said bottom side of said slot, each of said intermediately arranged conductors having a plurality of through holes perforated therein to provide a plurality of flow paths or allowing a cooling gas introduced from a periphery of said rotor core to flow in an axial direction of said rotor core while allowing the cooling gas to flow in a radial direction of said rotor care, wherein said plurality of through holes are disposed in a plurality of rows arranged in a width direction of said conductors, said plurality of flow paths being of a plurality of entry side flow paths composed of at least two rows of said plurality of rows and a plurality of exhaust side flow paths composed of at least two other rows of said plurality of rows.

17. An electric rotary machine according to claim 16, wherein said at least one conductor at the top of said slot has a plurality of through holes arranged in two rows in a width direction of said at least one conductor at the top of said slot, at least one conductor on the bottom side of said slot being one conductor at a bottom of said slot and at least one conductor arranged on said one conductor at the bottom of said slot, and said at least one conductor arranged on said conductor at the bottom of said slot having a plurality of through holes arranged in two rows in a width direction of said at least one conductor arranged on said one conductor at the bottom of said slot.

\* \* \* \* \*